United States Patent [19]

Nagai et al.

[11] Patent Number: 5,340,357
[45] Date of Patent: Aug. 23, 1994

[54] AIR-CONDITIONING BLOW-OUT PORT UNIT AND PROCESS FOR MANUFACTURING THE SAME

[75] Inventors: Yoshiyuki Nagai, Niiza; Hiroyuki Okamoto, Yokkaichi, both of Japan

[73] Assignee: Moriroku Kabushiki Kaisha, Tokyo, Japan

[21] Appl. No.: 965,920

[22] Filed: Oct. 23, 1992

[51] Int. Cl.$^5$ .............................................. B60H 1/34
[52] U.S. Cl. ..................................... 454/155; 454/319
[58] Field of Search ............... 454/109, 155, 315, 318, 454/319, 320

[56] References Cited

U.S. PATENT DOCUMENTS

| 4,103,601 | 8/1978 | Dayus | 454/319 |
| 4,414,170 | 11/1983 | Sano | 454/155 X |
| 4,546,695 | 10/1985 | Ouchi et al. | 454/155 X |

FOREIGN PATENT DOCUMENTS

| 59-48745 | 11/1984 | Japan . | |
| 76841 | 4/1986 | Japan | 454/155 |
| 128059 | 6/1986 | Japan | 454/155 |
| 191414 | 8/1986 | Japan | 454/155 |

*Primary Examiner*—Harold Joyce
*Attorney, Agent, or Firm*—Armstrong, Westerman, Hattori, McLeland & Naughton

[57] ABSTRACT

An air-conditioning blow-out port unit comprises a housing formed by a primary injection molding of synthetic resin and having a plurality of coaxially arranged shaft holes provided in opposed sidewalls, and a plurality of blades formed in the housing by a secondary injection molding of synthetic resin and each having a pair of support shafts projectingly provided at the opposite sides of a blade body and turnably fitted in each pair of the shaft holes. In this air-conditioning blow-out port unit, an extra shaft portion is consecutively formed on the support shaft to project outwardly from the housing with the same diameter as the support shaft, and a flange is formed between the support shaft and the blade body in an opposed relation to an inner surface of the housing. With this unit, a turning feeling of the blade can be stablized irrespective of thermal expansion and shrinkage of the housing and the blade.

15 Claims, 4 Drawing Sheets

AIR-CONDITIONING BLOW-OUT PORT UNIT AND PROCESS FOR MANUFACTURING THE SAME

BACKGROUND OF THE INVENTION

1. Field of the Invention

The present invention relates to an air-conditioning blow-out port unit to be mounted in an instrument panel or the like in an automobile, and particularly, to an improvement in air-conditioning blow-out port unit comprising a housing formed by a primary injection molding of synthetic resin and having a plurality of coaxially arranged pairs of shaft holes provided in opposed sidewalls, and a plurality of blades formed in the housing by a secondary injection molding of synthetic resin and each having a blade body and a pair of support shafts projectingly provided at opposite sides of the blade body and turnably fitted in each pair of the shaft holes.

2. Description of the Prior Art

An air-conditioning blow-out port unit of such type is already known, as disclosed, for example, in Japanese Patent Publication No. 48745/84.

In the prior art air-conditioning blow-out port unit, when the blades are formed by the secondary injection molding, an expanded head portion is formed at a tip and of each support shaft to abut against an outer surface of the housing. This expanded head portion is brought into a press contact with the outer surface of the housing by a thermal shrinkage occurring after the formation of the blades and functions to retain the blades in their turned positions by a friction resistance produced therebetween.

However, the blade is relatively long in a direction of the support shaft and for this reason, the following problem is encountered in use: The blade may be expanded and shrunk in a relatively large amount in the direction of the support shaft due to the variation in temperature of the surroundings, which is attended by a large increase and decrease in friction resistance between the expanded head portion and the housing, resulting in a variation in feeling of turning of the blade.

SUMMARY OF THE INVENTION

Accordingly, it is an object of the present invention to provide an air-conditioning blow-out port unit having a simple structure and designed to provide a blade-turning feeling always stable in use even due to a variation in temperature of the surroundings.

To achieve the above object, according to the present invention, there is provided an air-conditioning blow-out port unit comprising a housing formed by a primary injection molding of synthetic resin and having a plurality of coaxially arranged pairs of shaft holes provided in opposed sidewalls, and a plurality of blades formed in the housing by a secondary injection molding of synthetic resin and each having a blade body and a pair of support shafts projectingly provided at opposite sides of the blade body and turnably fitted in each pair of the shaft holes, wherein the air-conditioning blow-out port unit further includes an extra shaft portion consecutively formed on the support shaft to project outwardly from the housing with the same diameter as the support shaft, and a flange formed between the support shaft and the blade body in an opposed relation to an inner surface of the housing.

With the above construction, it is possible to prevent a variation in contact area and surface pressure between the support shaft and shaft hole even due to the expansion and shrinkage of the housing and the blades attendant on a variation in temperature in use, thereby stabilizing the friction torque of the support shaft and thus the feeling of turning of the blade. In addition, even when the blade is excessively expanded, it is possible to avoid the contact of the blade body with the flange by abutment of the flange against an inner surface of the housing, thereby preventing the blade-turning feeling from being degraded.

The above and other objects, features and advantages of the invention will become apparent from a consideration of the following description of the preferred embodiment taken in conjunction with the accompanying drawings.

BRIEF DESCRIPTION OF THE DRAWINGS

The drawings illustrate a preferred embodiment of the present invention, wherein.

DESCRIPTION OF THE PREFERRED EMBODIMENTS

The present invention will now be described by way of a preferred embodiment in connection with the accompanying drawings.

Figure 1:
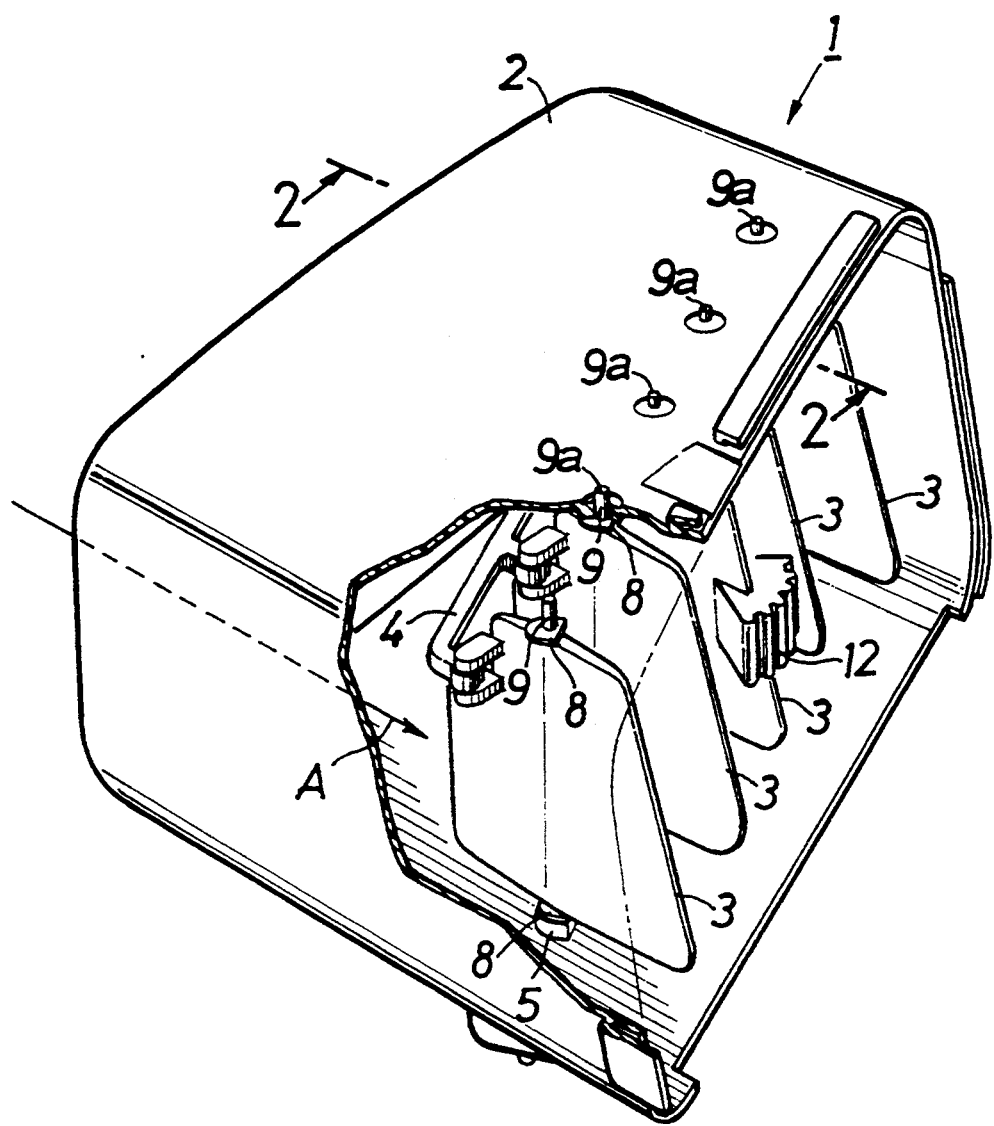
FIG. 1 is a partially cutaway perspective view of an air-conditioning blow-out port unit.

Referring first to FIG. 1, reference numeral 1 designates an air-conditioning blow-out port unit for an automobile. The blow-out port unit comprises a cylindrical housing 2 formed from a synthetic resin (e.g., an ABS resin) by a primary injection molding, a plurality of blades 3 formed in the housing 2 by a secondary injection molding from a synthetic resin having a melting point lower than that of the synthetic resin forming the housing 2. After the secondary injection molding, all the blades are connected to one another by a single link 4. The housing 2 is adapted to be mounted in an instrument panel of an automobile, and an air duct (not shown) is connected to a left end of the housing 2 as viewed in FIG. 1, so that air is blown in a direction of an arrow A.

Figure 2:
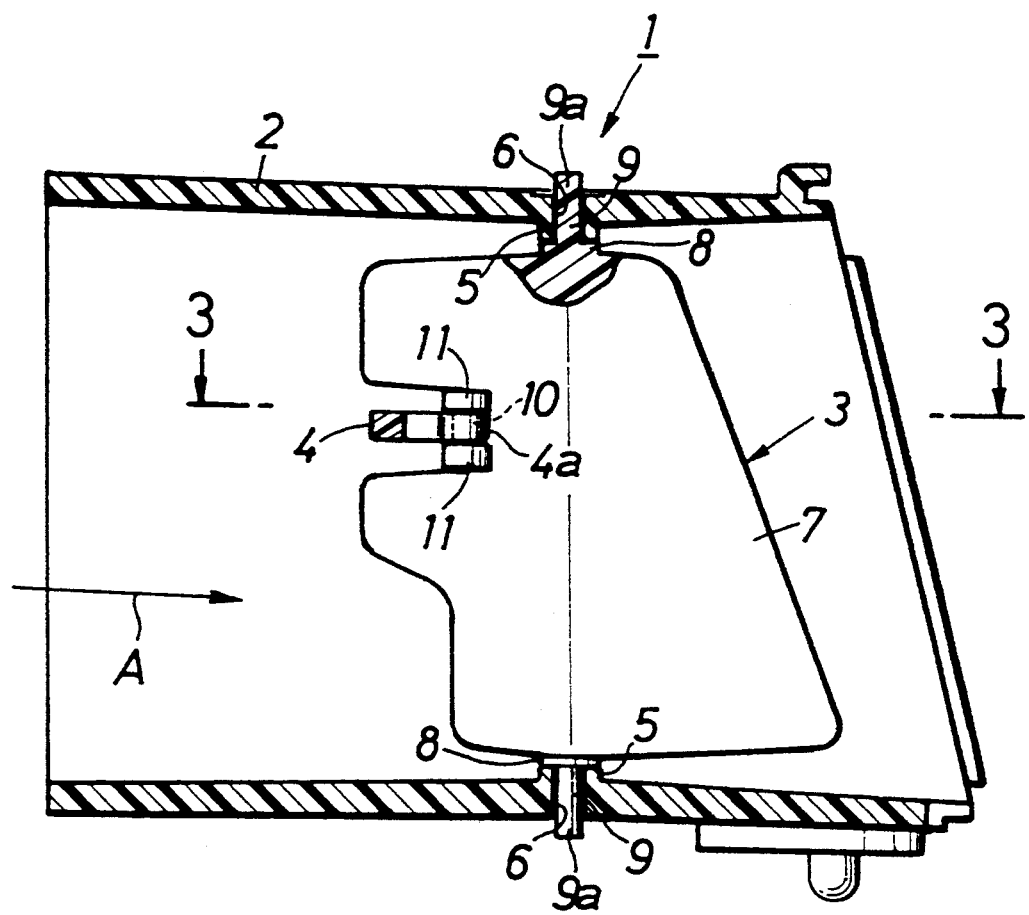
FIG. 2 is a sectional view taken along a line 2—2 in FIG. 1.
Figure 3:
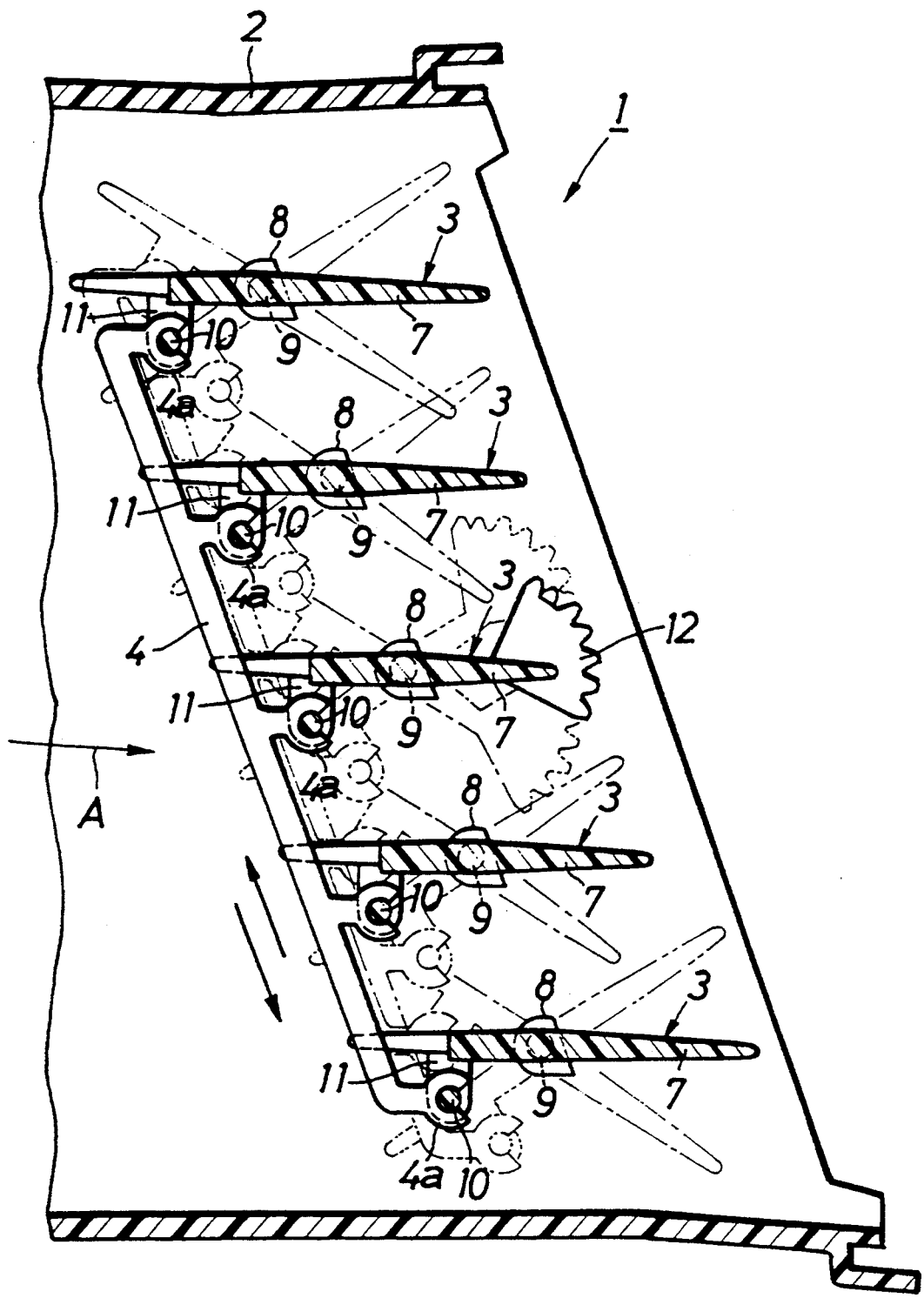
FIG. 3 is a sectional view taken along a line 3—3 in FIG. 2.

As shown in FIGS. 1 to 3, when the housing 2 is formed, the same number of pairs of vertically arranged bosses 5 as the blades 3 are formed on upper and lower walls of the housing 2, so that they are arranged laterally with their inner ends projecting onto an inner surface of the housing 2. The bosses 5 of each pair have coaxial shaft holes 6, respectively.

Each of the blades 3 is comprised of a pair of flanges 8 formed at vertically opposite ends of a blade body 7 and opposed to the inner end faces of the corresponding bosses 5, and a pair of support shafts 9 projecting from outer end faces of the flanges 8 and rotatably and slidably received in the corresponding shaft holes 6. The flange 8 is formed with a diameter larger than the thickness of the blade body 7. The support shaft 9 has an extra shaft portion 9a consecutively formed thereon to project outwardly from the housing 2 with the same diameter as the support shaft 9.

A pair of arms 11 interconnected through a connecting pin 10 are projectingly provided on a rear side of each blade body 7, which side faces an opposite direction from the air blowing direction A. Further, a knob 12 is formed on a front end of one of the blade bodies 7, which end faces the air blowing direction A.

Figure 4:
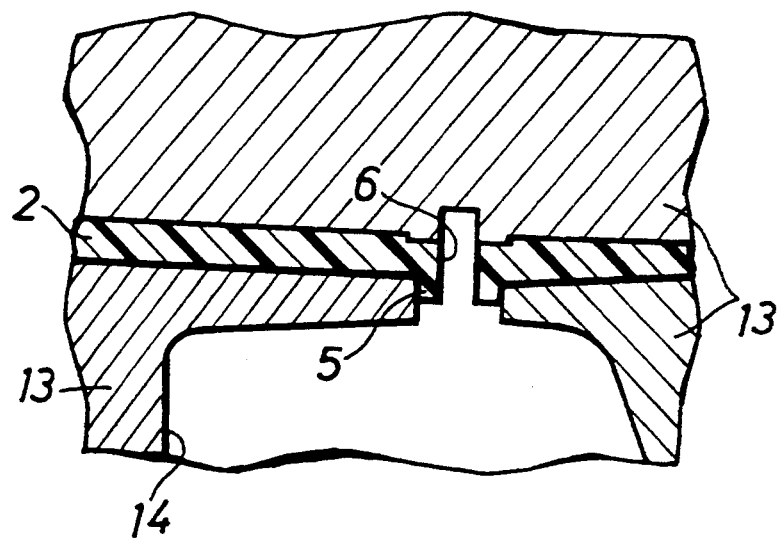
FIG. 4 is a view for explaining the formation of blades by a secondary injection molding.

In forming a large number of blades 3 having such a structure, the already-formed housing 2 is placed into a blade forming mold 13 with the shaft hole 6 and the inner end face of the boss 5 facing a cavity 14 in the mold 13, as shown in FIG. 4. A preselected synthetic resin is injected and filled into the cavity 14. The secondary injection is completed in this manner, whereby all the blades 3 are formed by one effort. Then, the mold 13 is opened after cooling, and the blades 3 are removed together with the housing 2 from the mold 13.

Thereafter, all the blades 3 are connected together by bringing a large number of C-shaped resilient connecting elements 4a integrally formed on the link 4 into resilient engagement with the connecting pins 10 of the blades 3, respectively. Thus, if the one knob 12 is swung laterally by a finger tip, all the blades 3 are turned laterally all together about the respective support shafts 9. This enables the direction of air blown from the housing 2 to be adjusted.

The operation of this embodiment will be described below.

The blade 3 formed in the housing 2 by the secondary injection molding has a melting point lower than that of the housing 2 and therefore, during the secondary injection molding, contact portions of the blade 3 and the housing 2 cannot be fused to each other. Rather, the support shaft 9 of each blade 3 is peeled off from the inner surface of the shaft hole 6 in the housing 2 into a moderate frictional contact relation to the inner surface due to a thermal shrinkage occurring after the secondary injection molding. The flange 8 of each blade 3 also becomes peeled off from the inner end face of the boss 5. Therefore, during turning of each blade 3, a suitable friction torque is produced between the support shaft 9 and the shaft hole 6, thereby providing a good turning feeling and enabling each blade 3 to be retained in a desired turned position by such friction torque.

In use, the housing 2 and each of the blades 3 are expanded or shrunk due to a variation in temperature of the surroundings. Particularly, suppose that each blade 3 is expanded or shrunk in a direction of the support shaft 9. In this case, each support shaft 9 has the extra shaft portion 9a normally projecting outwardly of the housing 2 and having the same diameter as the support shaft and therefore, the extra shaft portion 9a can enter and leave the corresponding shaft hole 6 with the expansion and shrinkage, thereby the latitude of fitting between the support shaft 9 and the shaft hole to be always maintained constant. Moreover, the support shaft 9 and the shaft hole 6 each have a relatively small diameter and hence, the variation in diameter thereof due to the variation in temperature is extremely small. As a result, it is possible to minimize the variation in friction torque between the support shaft 9 and the shaft hole 6, thereby stabilizing the feeling of turning of the blade 3.

Even when each blade 3 is expanded excessively in the direction of the support shaft 9, it is possible to avoid the contact between the housing 2 and the blade body 7 by engagement of the flanges 8 formed at the opposite sides of the blade body 7 with the inner end faces of the bosses 5, thereby preventing a variation in feeling of turning of the blade 3 to the utmost.

What is claimed is:

1. An air-conditioning blow-out port unit, comprising:
   a housing formed by a primary injection molding of synthetic resin;
   said housing having a plurality of pairs of coaxially arranged shaft holes provided in opposed sidewalls;
   a plurality of blades formed in the housing by a secondary injection molding of synthetic resin;
   each of said blades having a blade body and a pair of support shafts projectingly provided at opposite sides of said blade body and turnably fitted in each pair of the shaft holes;
   the diameter of each said support shaft being substantially constant along a length thereof and being substantially equal to and in moderate frictional contact with the inside diameter of the respective said shaft hole in a manner that a sufficient friction torque is generated between opposed peripheral surfaces of the support shaft and the shaft hole for retaining the support shaft at a turned position;
   an extra shaft portion consecutively formed on each of the support shafts and projecting outwardly from the housing with the same diameter as the support shaft such that a substantially constant area of surface contact between said diameter of the support shaft and said inside diameter of the shaft hole is maintained during variations in temperature sufficient to cause said support shafts to move axially relative to said shaft holes.

2. An air-conditioning blow-out port unit according to claim 1, wherein the synthetic resin used for said secondary injection molding has a melting point lower than that of the synthetic resin used for said primary injection molding.

3. An air-conditioning blow-out port unit according to claim 1, wherein the synthetic resin of said primary injection molding is an ABS resin, and the synthetic resin of said secondary injection molding is a polypropylene resin.

4. An air-conditioning blow-out port unit according to claim 1, wherein said blades are connected to one another by a single link having C-shaped connecting pieces integrally formed thereon and resiliently engageable with blade-connecting pins in corresponding blades, so as to turn said blades synchronously.

5. An air-conditioning blow-out port unit according to claim 1, wherein each of said blades has a pair of flanges provided at opposite sides of said blade body between the support shaft and the blade body in an opposed relation to inner surfaces of the housing.

6. An air-conditioning blow-out port unit according to claim 1, wherein each said support shaft has a substantially constant cross-section such that said opposed peripheral surfaces of each said shaft are substantially parallel to one another and such that said friction torque between the support shafts and the shaft holes will remain uniform even when the shafts move in directions in and out of said shaft holes.

7. An air-conditioning blow-out port unit according to claim 6, wherein said shafts are substantially cylindrical, said opposed peripheral surfaces of said support shaft being on the outer circumference of the support shaft.

8. An air-conditioning blow-out port unit according to claim 1, wherein each of said blades has a pair of flanges provided at opposite sides of said blade body between the support shaft and the blade body in an opposed relation to inner contact surfaces of the housing, and wherein said inner contact surfaces of said housing are provided on a pair of bosses projectingly provided on the inside of said housing in an opposed relation to said flanges.

9. An air-conditioning blow-out port unit, comprising:
- a housing formed by a primary injection molding of synthetic resin;
- said housing having a plurality of pairs of coaxially arranged shaft holes provided in opposed sidewalls;
- a plurality of blades formed in the housing by a secondary injection molding of synthetic resin;
- each of said blades having a blade body and a pair of support shafts projectingly provided at opposite sides of said blade body and turnably fitted in each pair of the shaft holes in a manner that a sufficient friction torque is generated between opposed peripheral surfaces of the support shaft and the shaft hole for retaining the support shaft at a turned position;
- an extra shaft portion consecutively formed on each of the support shafts and projecting outwardly from the housing with the same diameter as the support shaft;
- wherein each of said blades has a pair of flanges provided at opposite sides of said blade body between the support shaft and the blade body in an opposed relation to inner surfaces of the housing; and
- further including a pair of bosses projectingly provided on the inner surfaces of said housing in an opposed relation to said flanges.

10. An air-conditioning blow-out port unit according to claim 1, 2 or 3, in combination with an air conditioner system in an automobile.

11. A process for manufacturing an air-conditioning blow-out port unit, comprising the steps of:
(a) forming a housing having a plurality of pairs of coaxially arranged shaft holes in opposed sidewalls by primary injection molding of a synthetic resin;
(b) then placing said housing into a secondary injection mold;
(c) then forming a plurality of blades each having a blade body and a pair of support shafts projectingly provided at opposite ends of said blade body and turnably fitted in each pair of shaft holes by secondary injection of a synthetic resin into a cavity in said mold communicating with said shaft holes such that after cooling a sufficient friction torque is presented between opposed peripheral surfaces of the support shaft and the shaft hole for retaining the support shaft at a turned position, the diameter of each said support shaft being made substantially constant along a length thereof and being made substantially equal to and in moderate frictional contact with the inside diameter of the respective said shaft hole;
wherein in said step (c) an extra shaft portion is consecutively formed on said support shaft to project outwardly of the housing with the same diameter as said shaft hole such that a substantially constant area of surface contact between said diameter of the support shaft and said inside diameter of the shaft hole is maintained during variations in temperature sufficient to cause said support shafts to move axially relative to said shaft holes.

12. The process of claim 11, wherein each said support shaft is formed with a substantially constant cross-section such that said opposed peripheral surfaces of each said shaft are substantially parallel to one another and such that said friction torque between the support shafts and the shaft holes will remain uniform even when the shafts move in directions in and out of said shaft holes.

13. The process of claim 12, wherein said shafts are formed substantially cylindrical, said opposed peripheral surfaces of said support shaft being on the outer circumference of the support shaft.

14. The process of claim 11, wherein in said step (c) a flange is consecutively formed between said support shaft and said blade body in an opposed relation to an inner surface of said housing.

15. The process of claim 11, wherein in said step (c) a first mold portion is situated on outer surface of the housing and a second mold portion is situated inside of the housing; said first mold portion having a bore therein proximate to one of the shaft holes in said housing so as to enable formation of an extra shaft portion consecutively formed on the support shaft; and said second mold portion defining at least a portion of the respective blade.

* * * * *